United States Patent Office 3,487,130
Patented Dec. 30, 1969

3,487,130
HYDROXY CONTAINING PHOSPHORIC ACID ESTERS AND PROCESS FOR PRODUCING SAME
Allan K. Lazarus, Westfield, N.J., assignor to FMC Corporation, a corporation of Delaware
No Drawing. Filed Mar. 15, 1966, Ser. No. 534,432
Int. Cl. C07f 9/08; D06c 19/00
U.S. Cl. 260—953                                    11 Claims

ABSTRACT OF THE DISCLOSURE

Mono- and diesters of phosphoric acid comprising the reaction product of phosphoric acid and long chain epoxy compounds. Softener composition for treating textiles comprising a neutral aqueous solution of at least one of the aforesaid mono- or diesters of phosphoric acid.

---

The present invention is directed to the preparation of novel esters of phosphoric acid and to novel textile softener compositions containing said esters used to produce textiles having improved physical properties.

It is an object of the present invention to provide novel esters of phosphoric acid.

It is also an object of the present invention to provide novel textile softener compositions.

It is a further object of the invention to provide treated textiles having improved physical properties.

Other objects and advantages of the invention will in part be obvious, and will in part appear hereinafter.

The present invention contemplates using softener compositions containing novel monoesters and/or diesters of phosphoric acid, i.e., 2-hydroxy long-chain alkyl esters of phosphoric acid, and/or 2-hydroxy long-chain ether esters of phosphoric acid, to produce treated textiles which have significantly improved physical properties. The novel esters have the formula

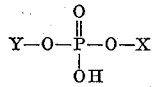

wherein X is selected from the group consisting of hydrogen and Y, and Y is the 2-hydroxyorganic group having the formula

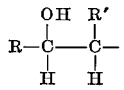

wherein R is an alkyl, or a hydrocarbon ether group, containing 11 to 18 carbon atoms, and R' is selected from the group consisting of hydrogen, methyl, and ethyl, and R and R' together contain 11 to 18 carbon atoms. These esters are produced by reacting long-chain alkyls and long-chain ethers, having a terminal or near terminal epoxide group, with phosphoric acid.

The reactant long-chain epoxides have the "epoxy" oxygen bridging the 1,2-carbon atoms, the 2,3-carbon atoms, or the 3,4-carbon atoms, and contain 13 to 20 carbon atoms in the chain. The straight chain alkyl groups are preferred, i.e., R' is hydrogen. Such materials are commonly prepared by the peroxidation of an olefin to the corresponding saturated epoxy. The preferred reactants are those having 14 to 20 carbon atoms in the alkyl chain, and having a terminal epoxide group, e.g., 1,2-epoxytetradecane, 1,2-epoxyhexadecane, and 1,2-epoxyoctadecane. The commercially available long-chain epoxy compounds are commonly mixtures of varying chain lengths. Such materials are suitable reactants in the present process and provide desired products.

Phosphoric acids containing as low as 85% of orthophosphoric acid may be used, although the use of 100% or higher phosphoric acid is preferred. The lower phosphorus content products contain free water. The presence of water encourages acid catalyzed hydrolysis of the epoxide reactant to the glycol, resulting in a competing side reaction producing the corresponding glycol phosphate as a by-product. Phosphoric acids rated in excess of 100% are referred to as "condensed phosphoric acids." These are commercially available as the 105%, and 115% products. Phosphoric acids having a strength in excess of 115% are less desirable in that the reaction with the epoxide reactant occurs with an excessive evolution of heat and resultant high temperature which promotes product degradation. These very high strength phosphoric acids are also extremely viscous and have poor solubility characteristics which result in difficulties in processing.

The ratio of epoxide reactant to phosphoric acid in the reaction mixture may vary from about 1:3 to 3:1. Ratios in the range of 1:2 to 2:1 are preferred, with the 1:1 ratio considered optimum.

The reaction may be carried out in a solvent. The proportion of solvent may vary widely. Solvents are preferably used where the final commercial product may contain the mixture of reaction products in the solvent, or may be prepared directly from the product solvent mixture. The useful solvents are those that are inert toward the epoxide reactant and the phosphoric acid reactant. The polar solvents, such as dioxane and acetone are the preferred solvents.

The reaction between the epoxide reactant and the phosphoric acid occurs readily and is exothermic. Simple mixing of the two materials is sufficient to cause reaction. It is preferred to utilize cooling means and agitation to prevent excessive temperature rise. The reaction temperature is preferably controlled between 0° C. and 100° C. Products prepared at temperatures above 50° C. tend to be off-color. The optimum reaction temperature is between 10° C. and 25° C.

The products of the reaction are primarily a mixture of the monoesters and the diesters. The diesters form even when epoxide:phosphoric acid ratio is 1:1 or less. The reaction mixture may also contain by-products caused by side reactions, such as (1) the phosphoric acid acting as a catalyst causing ether formation; (2) cyclization resulting in cyclic esters having the formula

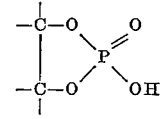

(3) residual phosphoric acid slowly esterifying the 2-hydroxy groups present in the 2-hydroxy phosphates, to form dimeric phosphates; and (4) the formation of glycol phosphates from the small amount of ring-opened alkyl usually present with the epoxide reactant. The reaction products containing the monoesters and diesters as the major constituents have been found useful as softeners for textile material without removal of these minor by-products.

Examples 1–18 illustrate the preparation of the esters of this invention. All parts and percentages herein are by weight.

The same procedure was followed in all the examples reported, except where specifically noted otherwise. A beaker in an ice bath was used as the reaction vessel. A motor-driven paddle stirrer provided agitation. The phosphoric acid was weighed directly into the beaker and stirring and cooling begun. Solvent, when used, was added. The epoxide was then added over a period of one to two minutes. Stirring and cooling were then continued for at least one-half hour. Cessation of cooling prior to a half-hour often resulted in the occurrence of an excessively exothermal reaction with resultant color degradation. After the cooling bath was removed, stirring was continued until the product reached room temperature. The reactants, and solvent when utilized, are listed in the following table. The reactants described, such as $C_{18}$–$C_{20}$, were prepared by epoxidizing a mixture of commercially available olefins having the chain lengths noted. The epoxy ether reactant of Example 11 is a long chain epoxy ether, predominantly a mixture of n-hexadecyl ($C_{16}$) and n-octadecyl ($C_{18}$) glycidol ethers. The percent specified after "solvent" refers to the solvent content of the reaction mixture.

the esters of phosphoric acid are acidic (about pH 1.5–2). The softener compositions also contain sufficient of a neutralizing agent to adjust the pH to about 6.5–7. Such neutralizing agents as sodium and potassium hydroxide, triethanolamine, and ammonium hydroxide may be used. Sodium hydroxide is the preferred neutralizing agent. Aqueous solutions of the phosphate esters form an emulsion. The unneutralized emulsions are relatively unstable. The neutralized emulsions, particularly those neutralized with sodium hydroxide, are relatively stable and exhibit long shelf life. The phosphate ester components of the composition are also relatively stable as determined by shelf-life tests.

Compositions containing the esters of hydrocarbons

| Ex. | Epoxide | Percent $H_3PO_4$ | Epoxide:$H_3PO_4$ mole ratio | Reaction temp., °C. | Solvent |
|---|---|---|---|---|---|
| 1 | $C_{14}$–$C_{16}$ | 105 | 1:1 | 10–25 | Dioxane (25%). |
| 2 | $C_{16}$–$C_{18}$ | 85 | 1:1 | 10–25 | None. |
| 3 | $C_{16}$–$C_{18}$ | 105 | 2:1 | 10–25 | Dioxane (25%). |
| 4 | $C_{16}$–$C_{18}$ | 105 | 1:1 | 10–25 | Dioxane (50%). |
| 5 | $C_{16}$–$C_{18}$ | 105 | 1:1 | 10–25 | Dioxane (25%). |
| 6 | $C_{16}$–$C_{18}$ | 105 | 1:1 | 10–25 | Acetone (25%). |
| 7 [1] | $C_{16}$–$C_{18}$ | 105 | 1:1 | 10–25 | Acetone (12½%). |
| 8 | $C_{16}$–$C_{18}$ | 105 | 1:1 | 10–25 | None. |
| 9 | $C_{16}$–$C_{18}$ | 115 | 1:1 | 10–25 | Dioxane (50%). |
| 10 | $C_{15}$–$C_{20}$ | 105 | 1:1 | 10–25 | Dioxane (25%). |
| 11 | Epoxy ether. | 105 | 1:1 | 10–25 | Dioxane (50%). |
| 12 | $C_{18}$–$C_{20}$ | 105 | 1:1 | 10–25 | Dioxane (25%). |
| 13 | $C_{17}$ | 105 | 1:1 | 10–25 | Do. |
| 14 | $C_{16}$–$C_{18}$ | 105 | 1:1 | 50 | Do. |
| 15 [2] | $C_{16}$–$C_{18}$ | 105 | 1:1 | 80 | Do. |
| 16 | $C_{16}$–$C_{18}$ | 105 | 1:1 | 100 | Do. |
| 17 | $C_{15}$–$C_{20}$ | 105 | 1:1 | 10–25 | Do. |
| 18 | $C_{15}$–$C_{20}$ | 105 | 1:1 | 10–25 | Do. |

[1] Water added after completion of the reaction.
[2] Epoxide added over 49 minutes.

The epoxide reactants utilized, with the exception of Example 18 were alpha epoxides. The reactant utilized in Example 18 was a mixture of internal epoxides having the epoxy moiety predominantly in the 2,3 and 3,4 positions.

The products of the examples were mixtures of the monoesters and the diesters. The monoester predominates, particularly in the products produced at lower temperatures. This is illustrated by the following results of analysis of the reaction mixture of the specified examples:

| Example | Reaction temp., °C. | Monoester, percent | Diester, percent | $H_3PO_4$, percent |
|---|---|---|---|---|
| No. 5 | 10–25 | 35.3 | 9.8 | 7.4 |
| No. 14 | 50 | 36.6 | 24.6 | 5.3 |
| No. 15 | 80 | 36.4 | 22.0 | 5.9 |
| No. 16 | 100 | 33.8 | 31.5 | 5.5 |

The monoesters and diesters may be separated and/or purified in accordance with procedures such as those described in Nelson et al., Inorganic Chem. 3, No. 4, pp. 775–777 (1963); McCready et al., J. Am. Chem. Soc., 66, pp. 560–563 (1944); Stewart et al., J. Chem. Soc. 73, pp. 1377–1378 (1951); Plimmer et al., J. Chem. Soc., 279, pp. 292–300 (1929); Cohen et al., Chem. Analyst, 47, pp. 86–87 (1958); and Martin et al., Anal. Chem., 21, p. 965 (1949).

The monoesters and diesters of phosphoric acid of this invention have distinct hydrophobic and hydrophilic components. They may be used as ore flotation reagents, drilling mud additives, lubricants for glass fibers, to provide anti-static finishes for textiles, and most particularly, as a component of softener compositions for treating textiles.

The softener compositions of the present invention, when used to treat fabrics, comprise neutral aqueous solutions containing between 0.01% and 5%, and preferably between 0.1% and 3% of the monoesters and/or diesters of phosphoric acid of this invention. Concentrated softener solutions containing between 15% and 50% of the esters are preferably marketed and diluted for application. Untreated aqueous solutions containing and ethers having chain-lengths of 14–20 carbon atoms provided useful softener compositions. Those prepared from alkyls having 16–18 carbon atoms in the chain are preferred. Compositions prepared from crude mixtures of the synthesis reaction products are preferred for preparing commercial softener compositions.

The aqueous softener compositions of this invention are applied to textile fabrics by dipping, padding, spraying, etc. The textile is then preferably squeezed to remove excess solution resulting in a wet-pickup on the textile of between 50% and 120% and preferably between about 65 and 85%. The textile is then dried. It is commonly then conditioned for several hours at a controlled temperature and atmosphere. The treated textile contains between about 0.006% and 4.3%, and preferably about 0.3% and 2.5%, of the phosphate ester product of this invention. The textiles to which the softener composition is applied may be prepared from natural fibers, such as cotton, regenerated fibers, such as viscose and rayon, and synthetic fibers such as the polyacrylics, polyamides, etc. The textiles of most interest are cotton textiles and those prepared from blends of cotton with other fibers. The treated textiles have superior tearing strength, abrasion resistance, and "hand" properties.

The preparation of the softener compositions, their application, and the properties of the treated textiles are illustrated in the following examples. The phosphoric acid ester product, in the form of a portion of the reaction mixture prepared as specified in the preceding examples, was used to prepare the softener compositions. A portion of the reaction mixture was mixed with about an equal volume of hot water until it was thoroughly dispersed in the water. Cold water was then added, with stirring, to almost the desired final volume. Sodium hydroxide was added to adjust the pH to 6.5. Any convenient strength sodium hydroxide may be used. When pH 6.5 was reached, agitation was continued and the pH again adjusted by addition of sodium hydroxide as necessary to maintain pH 6.5. Additional water is then added, as necessary, to attain the final desired concentration. This procedure was followed in preparing solutions containing 0.5%, and also solutions containing 2% of the esters of phosphoric acid of this invention. Alternatively, more concentrated solutions, such as those described hereinbefore, may be made up and adjusted to the desired pH, and the entire solution then diluted with cold water, with agitation, to the desired concentration.

A cotton print cloth in the form of a 9 inch wide strip of 80 by 80 threads per inch of material weighing about 4 yards per pound was continuously passed into a bath containing the softener composition, and then through squeeze rolls which removed excess solution resulting in a wet-pickup on the cloth of 70% to 80%. The cloth was then passed into an oven and dried at a temperature of from 90° C. to 105° C., for about four minutes. After drying, the cloth samples were conditioned at standard conditions (21° C. and 65% relative humidity) for at least four hours prior to testing. The dried, conditioned cloth samples had a good appearance and a good hand. They were tested for flex abrasion resistance and tear strength. The Flex Abrasion Test was carried out in accordance with ASTM D1175–55T, and the Tear Strength Test in accordance with ASTM D1424–59. The flex abrasion test is a comparative test with the pressure and tension adjusted to the material. All results reported were carried out under the same conditions.

| Example | Product from Example No. | Percent softener comp. | 1 Flex,[1] cycles | 2 Tear,[2] grams |
|---|---|---|---|---|
| 19 | Untreated | 0 | 215 | |
| 20 | 5 | 0.5 | 1,122 | 621 |
| 21 | 13 | 0.5 | 788 | 441 |
| 22 | 12 | 0.5 | 857 | 504 |
| 23 | 14 | 0.5 | 768 | |
| 24 | 15 | 0.5 | 799 | |
| 25 | 16 | 0.5 | 874 | |
| 26 | 18 | 0.5 | 725 | 464 |
| 27 | 10 | 0.5 | 975 | 505 |
| 28 | 3 | 2 | 1,684 | |
| 29 | [3]5 | 2 | 1,809 | 621 |
| 30 | 1 | 2 | 1,636 | |
| 31 | 11 | 2 | 1,699 | |
| 32 | 7 | 2 | 1,590 | |
| 33 | 8 | 2 | 1,667 | |
| 34 | 2 | 2 | 1,696 | |
| 35 | 9 | 2 | 1,776 | |

[1] ASTM 1175–55T.
[2] ASTM 1424–59.
[3] Neutralized with triethanolamine.

A comparison of the Flex Abrasion Test results illustrate the significant improvement in physical properties provided by treatment with the softener compositions of this invention.

What is claimed is:
1. Esters of phosphoric acid having the formula

$$Y-O-\underset{\underset{OH}{|}}{\overset{\overset{O}{\|}}{P}}-O-X$$

wherein X is selected from the group consisting of hydrogen and Y, and Y is the group

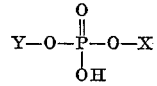

wherein R is selected from the group consisting of alkyl, and hydrocarbon ether, containing 11 to 18 carbon atoms and R' is selected from the group consisting of hydrogen, methyl and ethyl, and wherein R and R' together contain 11 to 18 carbon atoms.

2. The alkyl monoesters of claim 1 having the formula

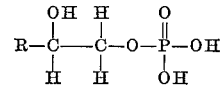

wherein R is an alkyl group containing 11 to 18 carbon atoms.

3. The monoesters of claim 2 wherein R is a normal alkyl.

4. The esters of claim 3 wherein R is a 12–18 carbon alkyl.

5. The alkyl diesters of phosphoric acid having the formula

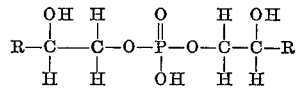

wherein R is an alkyl group containing 11 to 18 carbon atoms.

6. The esters of claim 5 wherein R is a normal alkyl.

7. The esters of claim 6 wherein R is a 12–18 carbon alkyl.

8. The process for preparing the ester of claim 1 comprising reacting, at a temperature between 0° C. and 100° C., phosphoric acid with an epoxide having the formula

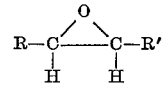

wherein R' is selected from the group consisting of hydrogen, methyl, and ethyl, and R is selected from the group consisting of alkyl, and hydrocarbon ether, containing 11 to 18 carbon atoms, and wherein R and R' together contain 11 to 18 carbon atoms, the molar ratio of said epoxide reactant and said phosphoric acid being between 1:3 and 3:1.

9. The process of claim 8 wherein said epoxide reactant is an epoxy alkyl, and said molar ratio is between 1:2 and 2:1, and said reaction temperature is between 0° C. and 50° C.

10. The process of claim 9 wherein said phosphoric acid is a phosphoric acid containing 100% to 115% phosphoric acid, and wherein said reaction temperature is between 10° C. and 25° C.

11. The process of claim 8 wherein said molar ratio is about 1:1.

References Cited

UNITED STATES PATENTS 2,372,244  3/1945  Adams et al. _____ 260—953

CHARLES B. PARKER, Primary Examiner

A. H. SUTTO, Assistant Examiner

U.S. Cl. X.R.

8—115.6, 116; 252—8.55, 8.6; 260—924, 925, 978